US009800866B2

(12) United States Patent
Green et al.

(10) Patent No.: US 9,800,866 B2
(45) Date of Patent: Oct. 24, 2017

(54) METHOD FOR PROVIDING AN ESTIMATION OF A POINT SPREAD FUNCTION INDICATIVE OF INTRINSIC CAMERA BLUR

(71) Applicant: Algolux Inc., Montreal, Quebec (CA)

(72) Inventors: Paul Green, Montreal (CA); Ali Mosleh, Longueuil (CA); Emmanuel Onzon, Lasalle (CA)

(73) Assignee: Algolux Inc., Montreal (CA)

( * ) Notice: Subject to any disclaimer, the term of this patent is extended or adjusted under 35 U.S.C. 154(b) by 0 days.

(21) Appl. No.: 15/093,501

(22) Filed: Apr. 7, 2016

(65) Prior Publication Data
US 2016/0301922 A1 Oct. 13, 2016

Related U.S. Application Data

(60) Provisional application No. 62/144,437, filed on Apr. 8, 2015.

(51) Int. Cl.
*H04N 17/00* (2006.01)
*H04N 17/02* (2006.01)
(Continued)

(52) U.S. Cl.
CPC ........... *H04N 17/002* (2013.01); *G06T 5/003* (2013.01); *G06T 5/50* (2013.01)

(58) Field of Classification Search
USPC ....... 348/188, 180, 181, 184, 187, 151, 159, 348/147, 141, 142, 14.12, 34, 35, 45, 46,
(Continued)

(56) References Cited

U.S. PATENT DOCUMENTS 7,627,193 B2 * 12/2009 Alon .................. G02B 27/0012
348/240.3
2004/0212677 A1 * 10/2004 Uebbing ................ H04N 7/181
348/155
(Continued)

OTHER PUBLICATIONS

Brauers et al., "Direct PSF Estimation Using a Random Noise Target," *IS&T/SPIE Electronic Imaging*, vol. 7537, 2010.
(Continued)

*Primary Examiner* — Jefferey F Harold
*Assistant Examiner* — Mustafizur Rahman
(74) *Attorney, Agent, or Firm* — Pearl Cohen Zedek Latzer Baratz LLP

(57) ABSTRACT

A method for determining a point spread function (PSF) of a camera, comprising: displaying on a display at least two images comprising visual features, elements having a different optical intensity, and a test pattern; acquiring the images using the camera; determining a coordinate transformation using the image comprising the visual features and its corresponding acquired image, the coordinate transformation for aligning together a coordinate system of the camera and a coordinate system of the display; aligning the acquired image comprising the elements having a different optical intensity using the determined coordinate system and determining a difference of intensity between the displayed image comprising the elements having a different optical intensity and the corresponding acquired image; aligning the acquired image comprising the test pattern and correcting an intensity of the acquired image comprising the test pattern, thereby obtaining a corrected image; and estimating a PSF using the corrected image.

20 Claims, 7 Drawing Sheets
(4 of 7 Drawing Sheet(s) Filed in Color)

(51) Int. Cl.
G06T 5/00 (2006.01)
G06T 5/50 (2006.01)
(58) Field of Classification Search
USPC ... 348/47, 48, 49, 50, 51, 54, 207.1, 207.11, 348/208.4, 208.11, 208.13, 251, 254, 290, 348/297, 333.09, 333.11, 341, 395.1, 348/425.2, 650, 658, 671, 756, 779, 781, 348/816, 832, 259; 345/175, 12, 32, 63, 345/77, 569, 589, 645, 690; 382/154, 382/201, 293
See application file for complete search history.

(56) References Cited

U.S. PATENT DOCUMENTS

| | | | | |
|---|---|---|---|---|
| 2005/0030410 A1* | 2/2005 | Tsukatani | ............... | G03B 19/12 348/360 |
| 2006/0203101 A1* | 9/2006 | Silsby | ............. | G08B 13/19658 348/222.1 |
| 2007/0183763 A1* | 8/2007 | Barnes | ................... | G01C 21/20 396/55 |
| 2009/0086274 A1* | 4/2009 | Robinson | ................. | H04N 1/56 358/2.1 |
| 2010/0128117 A1* | 5/2010 | Dyer | ................. | G06K 9/00604 348/78 |
| 2010/0232683 A1* | 9/2010 | Fujieda | ................. | G06T 7/0032 382/154 |
| 2010/0245591 A1* | 9/2010 | Tan | ...................... | H04N 9/3185 348/184 |
| 2011/0222781 A1* | 9/2011 | Nguyen | ............... | G06K 9/6244 382/218 |
| 2011/0310283 A1* | 12/2011 | Shiozaki | ............ | H04N 5/23293 348/333.06 |
| 2012/0075435 A1* | 3/2012 | Hovanky | ............... | H04N 13/02 348/51 |
| 2013/0027721 A1* | 1/2013 | Kobayashi | ........... | H04N 1/6086 358/1.9 |
| 2013/0258369 A1* | 10/2013 | Suzuki | ................. | G06K 15/027 358/1.9 |
| 2014/0132761 A1* | 5/2014 | Shih | ......................... | H04N 7/18 348/142 |
| 2014/0160075 A1* | 6/2014 | Chen | .................... | G06F 3/0428 345/175 |
| 2014/0240520 A1* | 8/2014 | Liu | ....................... | G06T 7/0018 348/187 |
| 2015/0015652 A1* | 1/2015 | Leighton | ................ | B65H 23/32 347/104 |
| 2016/0165226 A1* | 6/2016 | Djurdjevic | .......... | H04N 17/004 348/188 |

OTHER PUBLICATIONS

Brown, D.C. "Close-Range Camera Calibration," *Photogramm. Eng.*, 37:855-866, 1971.
Chan et al., "Total Variation Blind Deconvolution," *IEEE Transactions on Image Processing*, 7(3):370-375, Mar. 1998.
Cho et al., "Fast Motion Deblurring," *ACM Transactions on Graphics (SIGGRAPH)*, 28(5):145, Dec. 2009.
Cho et al., "Blur Kernel Estimation using the Radon Transform," *IEEE Conference on Computer Vision and Pattern Recognition (CVPR)*, pp. 241-248, 2011.
Delbracio et al., "Sub-Pixel Point Spread Function Estimation from Two Photographs at Different Distances," *SIAM Journal on Imaging Sciences*, 5(4):1234-1260, 2012.
Delbracio et al., "The non-parametric sub-pixel local point spread function estimation is a well posed problem," *International Journal of Computer Vision*, 96:175-194, 2012.
Fergus et al., "Removing camera shake from a single photograph," *ACM Transactions on Graphics (SIGGRAPH)*, 25(3):787-794, 2006.
Goldstein et al., "Blur-kernel estimation from spectral irregularities," *European Conference on Computer Vision (ECCV)*, pp. 622-635, 2012.
Heide et al., "High-quality computational imaging through simple lenses," *ACM Transactions on Graphics (SIGGRAPH)*, 2013.
Joshi et al., "PSF estimation using sharp edge prediction," *IEEE Conference on Computer Vision and Pattern Recognition (CVPR)*, pp. 1-8, 2008.
Kee et al., "Modeling and removing spatially-varying optical blur," *IEEE International Conference on Computational Photography (ICCP)*, pp. 1-8, 2011.
Krishnan et al. "Blind Deconvolution Using a Normalized Sparsity Measure," *IEEE Conference on Computer Vision and Pattern Recognition (CVPR)*, pp. 233-240, Jun. 2011.
Levin, A. "Blind motion deblurring using image statistics," *Advances in Neural Information Processing Systems (NIPS)*, pp. 841-848, 2006.
Levin et al., "Motion-invariant photography," *ACM Transactions on Graphics (SIGGRAPH)*, pp. 71:1-71:9, 2008.
Li et al., "Exploring aligned complementary image pair for blind motion deblurring," *IEEE Conference on Computer Vision and Pattern Recognition (CVPR)*, pp. 273-280, Jun. 2011.
Michaeli et al., "Blind deblurring using internal patch recurrence," *European Conference on Computer Vision (ECCV)*, pp. 783-798, 2014.
Shan et al., "High-quality Motion Deblurring from a Single Image," *ACM Trans. Graph.* 27, 3, Article 73, pp. 1-10 (Aug. 2008).
Shih et al., "Image enhancement using calibrated lens simulations," *European Conference on Computer Vision (ECCV)*, pp. 42-56, 2012.
Simoncelli, E., "Statistical models for images: compression, restoration and synthesis," *Conference Record of the Thirty-First Asilomar Conference on Signals, Systems amp; Computers.*, vol. 1, pp. 673-678 vol. 1, Nov. 1997.
Simpkins et al. "Robust grid registration for non-blind PSF estimation," Proc. SPIE 8305, Visual Information Processing and Communication III, 83050I, 2012.
Simpkins et al. "Parameterized modeling of spatially varying optical blur," Journal of Electronic Imaging, 23(1):013005, 2014.
Sun et al., "Edge-based blur kernel estimation using patch priors", International Conference on Computational Camera (ICCP), 2013.
Trimeche et al. "Multichannel image deblurring of raw color components," SPIE Computational Imaging, 2005.
Xu et al. "Two-Phase Kernel Estimation for Robust Motion Deblurring," European Conference on Computer Vision (ECCV), Part 1, LNCS 6311, pp. 157-170, Springer, 2010.
You et al. "A Regularization Approach to Joint Blur Identification and Image Restoration," IEEE Transactions on Image Processing, 5(3):416-428, Mar. 1996.
Yuen et al. "Image Deblurring with Blurred/Noisy Image Pairs," ACM Transactions on Graphics (TOG), 2007.
Yue et al., "Hybrid Image Deblurring by Fusing Edge and Power Spectrum Information," European Conference on Computer Vision (ECCV), 2014.
Zandhuis et al. "Sub-pixel non-parametric PSF estimation for image enhancement," IEE Proceedings Vision, Image and Signal Processing, vol. 144, No. 5, pp. 285-292, Oct. 1997.

* cited by examiner

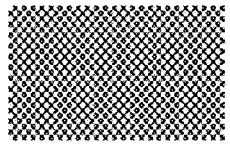 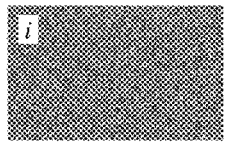  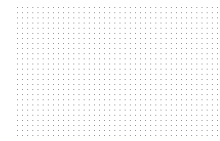
FIGURE 4a  FIGURE 4b  FIGURE 4c  FIGURE 4d
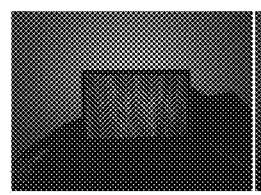 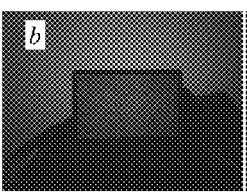 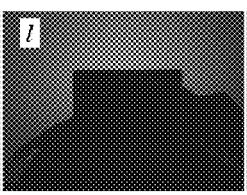 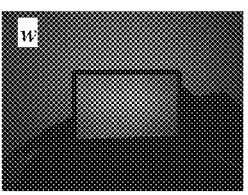
FIGURE 4e  FIGURE 4f  FIGURE 4g  FIGURE 4h
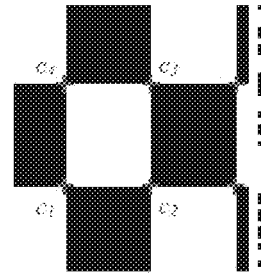 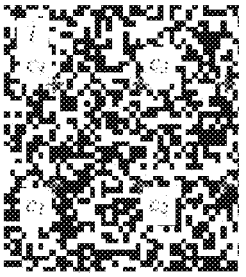 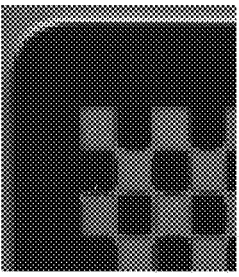 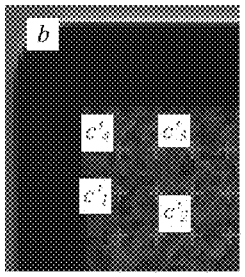
FIGURE 4i  FIGURE 4j  FIGURE 4k  FIGURE 4l
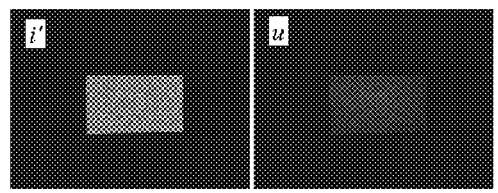
FIGURE 4m  FIGURE 4n Require: $c_1, c_2, c_3, c_4$ and $c'_1, c'_2, c'_3, c'_4$ for all $N_{cb}$ checkerboard blocks, captured noise pattern $h$, synthetic noise pattern $i$
1: Generate $M \times N$ matrices of zeros $count$ and $\hat{i}$
2: for all $N_{cb}$ blocks do
3:    map $[v_1, v_2]$ to $[0, 1]$ and $[u_1, u_2]$ to $[0, 1]$
4:    for $u = u_1$ to $u_2$, step: $S_p$ do
5:      find $x$ and $y$ using Eq. (3)
6:      $count(x, y) \leftarrow count(x, y) + 1$
7:      $\hat{i}(x, y) \leftarrow \left(\hat{i}(x, y) + i(u, v)\right) / count(x, y)$
8:    end for
9: end for
10: return $\hat{i}$

FIGURE 5

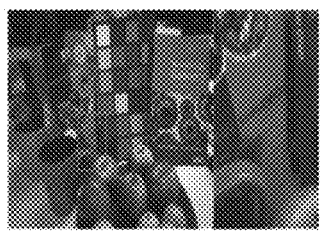

FIGURE 6a

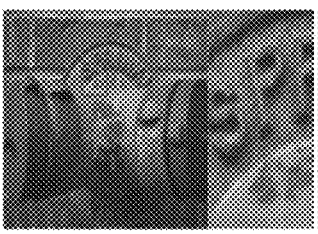

FIGURE 6c

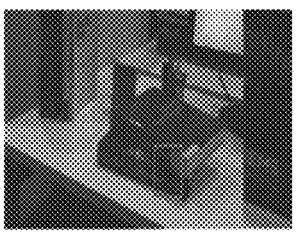

FIGURE 6e

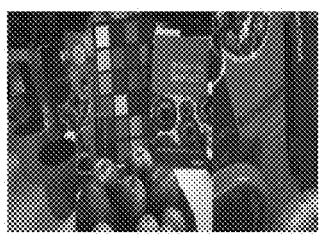

FIGURE 6b

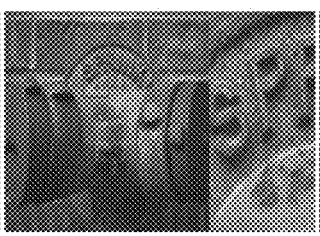

FIGURE 6d

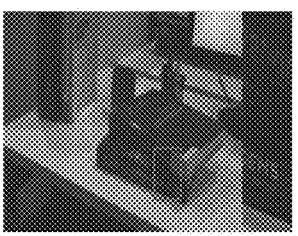

FIGURE 6f

METHOD FOR PROVIDING AN ESTIMATION OF A POINT SPREAD FUNCTION INDICATIVE OF INTRINSIC CAMERA BLUR

CROSS REFERENCE TO RELATED APPLICATION

This application claims the benefit of U.S. Provisional Patent Application No. 62/144,437, filed Apr. 8, 2015, the contents of which are incorporated by reference herein in its entirety.

FIELD OF THE INVENTION

The invention relates to electronics. More precisely, the invention pertains to a method for providing an estimation of a point spread function indicative of intrinsic lens blur.

BACKGROUND OF THE INVENTION

The quality of images formed by lenses is limited by the blur generated during the exposure. Blur most often occurs on out-of-focus objects or due to camera motion. While these kinds of blur can be prevented by adequate photography skills, there is a permanent intrinsic blur caused by the optics of image formation lens aberration and light diffraction.

Image deconvolution can reduce this intrinsic blur if the lens PSF is precisely known. The point spread function (PSF) can be measured directly using laser and precision collimator or pinhole image analysis. However, these approaches require sophisticated and expensive equipment. Modeling the PSF by means of camera lens prescription (see Y. Shih, B. Guenter, and N. Joshi, "Image enhancement using calibrated lens simulations", *European Conference on Computer Vision (ECCV)*, pages 42-56, 2012) or parameterized techniques (J. Simpkins and R. L. Stevenson, "Parameterized modeling of spatially varying optical blur", *Journal of Electronic Imaging*, 23(1):013005-013005, 2014) is also possible. Unfortunately, these techniques are often applicable only for certain camera configurations and need fundamental adjustments for various configurations.

Hence, there is a requirement to measure the blur function by analyzing the captured images. Such a PSF estimation is an ill-posed problem that can be approached by blind and non-blind methods. This problem is even more challenging for mobile devices since they have a very small sensor area that typically creates a large amount of noise.

Blind PSF estimation is performed on a single observed image (S. Cho and S. Lee, "Fast motion deblurring", *ACM Transactions on Graphics (SIGGRAPH)*, 28(5):145, 2009; R. Fergus, B. Singh, A. Hertzmann, S. T. Roweis, and W. T. Freeman. "Removing camera shake from a single photograph", *ACM Transactions on Graphics (SIGGRAPH)*, 25(3):787-794, 2006; A. Goldstein and R. Fattal, "Blur-kernel estimation from spectral irregularities", *European Conference on Computer Vision (ECCV)*, pages 622-635, 2012; N. Joshi, R. Szeliski, and D. Kriegman, "PSF estimation using sharp edge prediction", *IEEE Conference on Computer Vision and Pattern Recognition (CVPR)*, pages 1-8, 2008; A. Levin, "Blind motion deblurring using image statistics", *Advances in Neural Information Processing Systems (NIPS)*, pages 841-848, 2006; T. Michaeli and M. Irani, "Blind deblurring using internal patch recurrence", *European Conference on Computer Vision (ECCV)*, pages 783-798, 2014; L. Sun, S. Cho, J. Wang, and J. Hays, "Edge-based blur kernel estimation using patch priors", *International Conference on Computational Camera (ICCP)*, 2013; L. Xu and J. Jia, "Two-phase kernel estimation for robust motion deblurring", *European Conference on Computer Vision (ECCV)*, pages 157-170, Springer, 2010; T. Yue, S. Cho, J. Wang, and Q. Dai, "Hybrid image deblurring by fusing edge and power spectrum information", *European Conference on Computer Vision (ECCV)*, pages 79-93, 2014) or a set of observed images (M. Delbracio, A. Almansa, J. M. Morel, and P. Muse. "Sub-pixel point spread function estimation from two photographs at different distances", *SIAM Journal on Imaging Sciences*, 5(4):1234-1260, 2012; W. Li, J. Zhang, and Q. Dai. "Exploring aligned complementary image pair for blind motion deblurring", *IEEE Conference on Computer Vision and Pattern Recognition (CVPR)*, pages 273-280, June 2011; L. Yuan, J. Sun, L. Quan, and H.-Y. Shum. "Image deblurring with blurred/noisy image pairs", *ACM Transactions on Graphics (SIGGRAPH)*, 26(3):1-10, 2007). The features of the latent sharp image are modeled, and then the model is employed in an optimization process to estimate a PSF.

Given the knowledge that the gradient of sharp images generally follows a heavy-tailed distribution (E. Simoncelli, "Statistical models for images: compression, restoration and synthesis", *Conference Record of the Thirty-First Asilomar Conference on Signals, Systems amp; Computers*, volume 1, pages 673-678 vol. 1, November 1997), Gaussian (Y.-L. You and M. Kaveh, "A regularization approach to joint blur identification and image restoration", *IEEE Transactions on Image Processing*, 5(3):416-428, March 1996), Laplacian (T. Chan and C.-K. Wong, "Total variation blind deconvolution", *IEEE Transactions on Image Processing*, 7(3):370-375, March 1998), and hyper-Laplacian (A. Levin, P. Sand, T. S. Cho, F. Durand, and W. T. Freeman, "Motion-invariant photography", *ACM Transactions on Graphics (SIGGRAPH)*, pages 71:1-71:9, 2008).

In addition to these general priors, local edges and a Gaussian prior on the PSF are used in edge-based PSF estimation techniques (see S. Cho and S. Lee, "Fast motion deblurring", *ACM Transactions on Graphics (SIGGRAPH)*, 28(5):145, 2009; T. S. Cho, S. Paris, B. K. Horn, and W. T. Freeman, "Blur kernel estimation using the radon transform", *IEEE Conference on Computer Vision and Pattern Recognition (CVPR)*, pages 241-248, 2011; N. Joshi, R. Szeliski, and D. Kriegman, "PSF estimation using sharp edge prediction", *IEEE Conference on Computer Vision and Pattern Recognition (CVPR)*, pages 1-8, 2008; L. Xu and J. Jia, "Two-phase kernel estimation for robust motion deblurring", *European Conference on Computer Vision (ECCV)*, pages 157-170, Springer, 2010).

In general, blind PSF estimation methods are suitable to measure the extrinsic camera blur function rather than the intrinsic one.

Non-blind PSF estimation techniques assume that given a known target and its captured image, the lens PSF can be accurately estimated.

Zandhuis et al. (J. Zandhuis, D. Pycock, S. Quigley, and P. Webb, "Sub-pixel non-parametric PSF estimation for image enhancement", *IEEE Proceedings—Vision, Image and Signal Processing*, volume 144, pages 285-292, 1997) propose to use slanted edges in the calibration pattern. Several one-dimensional responses are required that are based on a symmetry assumption for the kernel. A checkerboard pattern is used as the calibration target by Trimeche (M. Trimeche, D. Paliy, M. Vehvilainen, and V. Katkovnic, "Multichannel image deblurring of raw color components", *SPIE Computational Imaging*, pages 169-178, 2005), and the PSF is estimated by inverse filtering given the sharp checkerboard pattern and its photograph.

Joshi's non-blind PSF estimation (N. Joshi, R. Szeliski, and D. Kriegman, "PSF estimation using sharp edge prediction", *IEEE Conference on Computer Vision and Pattern Recognition (CVPR)*, pages 1-8, 2008) relies on an arc-shaped checkerboard-like pattern. The PSF is estimated by introducing a penalty term on its gradient's norm.

In a similar scheme, Heide et al. (F. Heide, M. Rouf, M. B. Hullin, B. Labitzke, W. Heidrich, and A. Kolb, "High-quality computational imaging through simple lenses", *ACM Transactions on Graphics (SIGGRAPH)*, 2013) estimate the PSF using the norm of PSF's gradient in the optimization process. They propose to use a white-noise pattern rather than regular checkerboard image or Joshi's arc-shaped pattern as the calibration target. This method also constrains the energy of the PSF by introducing a normalization prior to the PSF estimation function.

Kee et al. (E. Kee, S. Paris, S. Chen, and J. Wang, "Modeling and removing spatially-varying optical blur", *IEEE International Conference on Computational Photography (ICCP)*, pages 1-8, 2011) propose a test chart that consists of a checkerboard pattern with complement black and white circles in each block. The PSF estimation problem is solved using least squares minimization and thresholding out negative values generated in the result.

A random noise target is also used in Brauers's PSF estimation technique (J. Brauers, C. Seiler, and T. Aach, "Direct PSF estimation using a random noise target", *IS&T/SPIE Electronic Imaging*, pages 75370B-75370B, 2010). They propose to apply inverse filtering to measure the PSF, and then threshold it as a naive regularization.

Delbracio et al. show (M. Delbracio, P. Musé, A. Almansa, and J.-M. Morel, "The non-parametric sub-pixel local point spread function estimation is a well posed problem", *International Journal of Computer Vision*, 96:175-194, 2012) that a noise pattern with a Bernoulli distribution with an expectation of 0.5 is an ideal calibration pattern in terms of well-posedness of the PSF estimation functional. In other words, pseudo-inverse filtering without any regularization term would result in a near optimal PSF. The downside of the direct pseudo-inverse filtering is that it does not consider the non-negativity constraint of the PSF. Hence, the PSF can be wrongly measured in presence of even a little amount of noise in the captured image.

These techniques rely strongly on an accurate alignment (geometric and radiometric) between the calibration pattern and its observation.

There is a need for a method that will overcome at least one of the above-identified drawbacks.

Features of the invention will be apparent from review of the disclosure, drawings and description of the invention below.

BRIEF SUMMARY OF THE INVENTION

According to a broad aspect, there is provided a computer-implemented method for providing an estimation of a point spread function indicative of intrinsic lens blur of a camera, the method comprising: successively displaying at least two images on a same display unit, the at least two images comprising visual features, elements having a different optical intensity, and a test pattern; acquiring the at least two images using the camera; determining a coordinate transformation using the image displayed comprising the visual features and the corresponding acquired image, the coordinate transformation for aligning together a coordinate system of the camera and a coordinate system of the display unit; aligning the acquired image comprising the elements having a different optical intensity using the determined coordinate system and determining a difference of intensity between the displayed image comprising the elements having a different optical intensity and the corresponding acquired image; aligning the acquired image comprising the test pattern using the determined coordinate transformation and correcting an intensity of the acquired image comprising the test pattern using the determined difference of intensity, thereby obtaining a corrected image; estimating a point spread function using the corrected image; and outputting the estimation of the point spread function.

In one embodiment, the step of displaying at least two images comprises displaying a first image comprises black and white features and a second image comprising the test pattern, the black and white features corresponding to both the visual features and the elements having a different intensity.

In one embodiment, the method further comprises generating a white image and a black image using the first image comprising black and white features.

In another embodiment, the step of displaying at least two images comprises displaying a first image comprising the visual features, a second black image, a third white image, and a fourth image comprising the test pattern.

In one embodiment, the visual features comprise a checkerboard.

In one embodiment, the step of determining a coordinate transformation comprises: identifying a position of white and black squares contained in the checkerboard of the displayed first image and in a checkerboard of the corresponding acquired image, said determining a coordinate transformation being performed using the position of the white and black squares.

In one embodiment, the position of the white and black squares is represented by a position of corners of the white and black squares.

In one embodiment, the step of determining a coordinate transformation comprises using a bilinear interpolation.

In one embodiment, the step of determining a difference of intensity comprises determining a difference of intensity between the displayed second black image and a corresponding one of the at least two acquired images and determining a difference of intensity between the displayed third white image and a corresponding one of the at least two acquired images.

In one embodiment, the test pattern comprises a Bernoulli noise pattern.

In one embodiment, the step of displaying comprises using a display having a high resolution screen.

In accordance with another broad aspect, there is provided a system for providing an estimation of a point spread function (PSF) indicative of intrinsic lens blur of a camera, the method comprising: a display unit for successively displaying at least two images thereon, the at least two images comprising visual features, elements having a different optical intensity, and a test pattern; a camera for acquiring the at least two images using the camera; a transformation unit for determining a coordinate transformation using the image displayed comprising the visual features and the corresponding acquired image, the coordinate transformation for aligning together a coordinate system of the camera and a coordinate system of the display unit; an intensity unit for aligning the acquired image comprising the elements having a different optical intensity using the determined coordinate system and determining a difference of intensity between the displayed image comprising the elements having a different optical intensity and the corresponding acquired image; a PSF unit for aligning the acquired image comprising the test pattern using the determined coordinate transformation, correcting an intensity of the acquired image comprising the test pattern using the determined difference of intensity, thereby obtaining a corrected image, estimating a point spread function using the corrected image, and outputting the estimation of the point spread function.

In one embodiment, the display is adapted to display a first image comprises black and white features and a second image comprising the test pattern, the black and white features corresponding to both the visual features and the elements having a different intensity.

In one embodiment, the intensity unit is further adapted to generate a white image and a black image using the first image comprising black and white features.

In another embodiment, the display is adapted to display a first image comprising the visual features, a second black image, a third white image, and a fourth image comprising the test pattern.

In one embodiment, the visual features comprise a checkerboard.

In one embodiment, the transformation unit is adapted to: identify a position of white and black squares contained in the checkerboard of the displayed first image and in a checkerboard of the corresponding acquired image, the transformation unit being adapted to determine the coordinate transformation using the position of the white and black squares.

In one embodiment, the position of the white and black squares is represented by a position of corners of the white and black squares.

In one embodiment, the transformation unit is adapted to use a bilinear interpolation for determining the coordinate transformation.

In one embodiment, the intensity unit is adapted to determine a difference of intensity between the displayed second black image and a corresponding one of the at least two acquired images and determine a difference of intensity between the displayed third white image and a corresponding one of the at least two acquired images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order that the invention may be readily understood, embodiments of the invention are illustrated by way of example in the accompanying drawings.

FIG. 4a illustrates a checkerboard, in accordance with an embodiment;

FIG. 4b illustrates a noise pattern, in accordance with an embodiment;

FIG. 4c illustrates a black image, in accordance with an embodiment;

FIG. 4d illustrates a white image, in accordance with an embodiment;

FIGS. 4e-4h illustrate the images of FIGS. 4a-4d, respectively, when displayed on a display unit, in accordance with an embodiment;

FIG. 4i illustrates corners of a square in the checkerboard of FIG. 4a, in accordance with an embodiment;

FIG. 4j illustrates the corners of FIG. 4i identified in the noise pattern of FIG. 4b, in accordance with an embodiment;

FIG. 4k illustrates the corners of FIG. 4i identified in the acquired image corresponding to FIG. 4e, in accordance with an embodiment;

FIG. 4l illustrates the corners of FIG. 4j identified in the acquired image corresponding to FIG. 4f, in accordance with an embodiment;

FIGS. 4m and 4n illustrate warped and color corrected sharp noise patterns, in accordance with an embodiment;

FIG. 5 shows an embodiment of an algorithm used for performing a bilinear warping;

FIG. 6a illustrates a first exemplary image captured using the camera of a Blackberry™ phone;

FIG. 6b illustrates a second exemplary image captured using the camera of the Blackberry™ phone of FIG. 6a;

FIG. 6c illustrates a third exemplary image captured using a Ximea™ camera;

FIGS. 6d-6f illustrate the images of FIG. 6a-6c, respectively, once deblurred using the PSF measured using the method of FIG. 1, in accordance with an embodiment;

Figure 1:
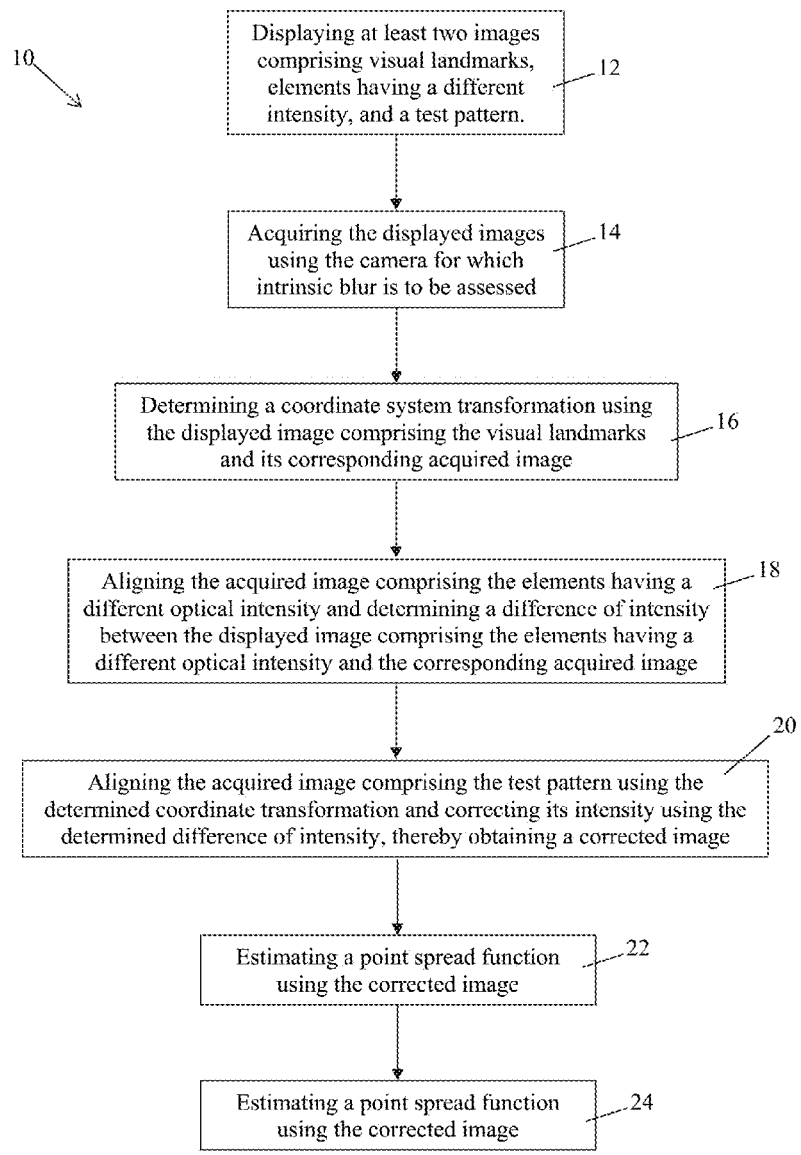
FIG. 1 is a flowchart illustrating a non-blind method for providing an estimation of a point spread function indicative of intrinsic lens blur, in accordance with a first embodiment.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus do not limit the terms or phrases they explain. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a non-blind method for measuring intrinsic camera blur.

It will be appreciated that a perspective projection of a 3D world scene onto a focal plane is the base of camera model. In fact, light rays are concentrated via a system of lenses toward the focal plane passing through the aperture. It is often assumed that the observed scene i is planar. Hence, the perspective projection can be modelled as a planar homography h. The perspective projection is followed by some distortion due to the physics of imaging, especially the use of a non-pinhole aperture in real cameras.

Denoting the geometric distortion function by d, image formation can be modeled as:

$$b = S(v(d(h(i)))*k) + n, \quad (1)$$

where b is a captured image, k is a PSF that represents lens aberrations, v denotes optical vignetting often caused by physical dimensions of multi-element lens, S is the sensor's sampling function, and n represents additive zero-mean Gaussian noise. It can be assumed that the camera response function is linear, and for brevity is avoided in equation (1).

It will be appreciated that measuring the intrinsic blur kernel k given the observed image b and a known scene i requires an accurate estimation of h, d, and v in equation (1).

The homography h is often estimated using some known feature points in i (corners in checkerboard calibration pattern) and fitting them to the corresponding points in the observed image b, and then the effect of distortion d is taken into account by Brown's radial-tangential model (see D. C. Brown, "Close-range camera calibration," *Photogramm. Eng.*, 37:855-866, 1971).

After warping i according to h and d, devignetting/color correction algorithms are applied to estimate v in order to generate a sharp correspondence u=v(d(h(i))) of the observed image b to be used in the imaging model:

$$b = S(u*k) + n. \quad (2)$$

It will be appreciated that observation-scene alignment (the homography h, the effect of distortion d and the lens aberration v estimation) is prone to severe errors.

It will be appreciated that the method disclosed herein avoids prior-art calculation of homography, distortion, and vignetting.

Now referring to FIG. 1, there is shown a computer-implemented non-blind method 10 for providing an estimation of a point spread function indicative of intrinsic lens blur. In one embodiment, the method 10 is executed by a computer or machine provided with at least one processing unit, a memory or storing unit, and communication means. The memory comprises statements and instructions stored thereon that when executed by the processing unit perform the steps of the method 10.

At step 12, at least two images are successively displayed on a same display unit. The images comprise visual features or landmarks, elements having a different intensity, and a test pattern.

In one embodiment, the visual landmarks are distributed throughout the whole screen of the display unit. In one embodiment, the landmarks are evenly distributed. For example, the landmarks may comprise elements having a different geometrical shape such as square elements and triangular elements. In another example, the visual landmarks may comprise elements having a same geometrical shape. The color of adjacent elements having the same geometrical shape may change. For example, an image may comprise a checkerboard. In this case, the visual landmarks comprise white squares and black squares.

In one embodiment, at least four images are displayed at step 12. The first image may comprise visual landmarks. The second image may comprise a test pattern. The third image may be a white image while the fourth image is a black image. In this case, the white and black images correspond to the elements having a different intensity In another embodiment, two images are displayed at step 12. The first image comprises the visual landmarks and the elements having a different intensity while the second image comprises the test pattern. For example, the first image may comprise a checkerboard. In this case, the white and black squares correspond to both the visual landmarks and the elements having a different intensity.

It should be understood that the position and shape of the landmarks on the displayed image is known. Similarly, the intensity value of each pixel representing the elements having a different intensity on the displayed image is also known.

It should be understood that the visual landmarks, the elements having a different intensities and the test pattern should be in any one of the displayed images as long as the visual landmarks and the test pattern are located in different displayed images. For instance, a first image may comprise visual landmarks and a first element having a first intensity while the second image may comprise a second element having a second intensity and a test pattern.

In another example, the first image may comprise visual landmarks while the second image may comprise elements having a different intensity and a test pattern.

In a further example and as described above, a first image may comprise the visual landmarks, a second image may comprise the test pattern, a third image may comprise a first element having a first intensity such as a white image, and the fourth image may comprise a second element having a second and different intensity such as a black image.

The skilled addressee will appreciate that various alternative embodiments may be possible as further explained below.

It will be appreciated that a controllable/changing pattern or display unit is used for displaying the at least two images. In fact, it will be appreciated that the display could be implemented in many ways such as for instance as a normal monitor, e-ink, projector, interchangeable slides, DMD, etc.

Also, it will be appreciated that the system could include a relay lens system to allow PSF calibration at different distances.

At step 14, the at least two displayed images are acquired by the camera of which blur is to be assessed. The acquisition of the images is performed successively while the images are displayed on the display unit. It should be understood that the relative position between the display unit and the camera should not be changed during the acquisition of the images.

At step 16, the transformation between the coordinate system of the camera and that of the display unit is determined. The transformation allows aligning the coordinate system of the camera on that of the display unit. The displayed image comprising the visual landmarks and its corresponding acquired image are used for determining the coordinate system transformation. The transformation is determined by comparing the position of the visual landmarks in the acquired image to the position of their corresponding visual landmarks in the displayed image. It should be understood that any adequate method for determining a coordinate system transformation between the two images comprising the visual landmarks may be used.

At step 18, the images comprising the elements having a different intensity are aligned on the coordinate system of the display unit using the transformation determined at step 16. Once the alignment performed, the difference of intensity between the displayed images and their respective acquired images is determined.

In an embodiment in which the at least two images comprises a black image and a white image, the difference of intensity is determined using the displayed black and white images and their corresponding acquired images.

In an embodiment in which the visual landmarks comprise black and white geometrical elements, the method further comprises a step of generating a white image and a black image from the image containing the black and white visual elements. The white image may be generated by interpolating white pixels in the black element regions, and the black image may be generated by interpolating black pixels in the white element regions.

At step 20, the acquired image comprising the test pattern is corrected, i.e. it is aligned on the coordinate system of the display unit using the determined transformation and the intensity of the acquired image comprising the test pattern is corrected using the determined intensity difference.

Then the corrected image comprising the test pattern is used to determine the PSF using the method described below.

At step 24, the determined PSF is outputted and stored in memory.

In one embodiment, the determined PSF is used to reduce or cancel the blur present in images subsequently acquired using the camera.

Figure 2:
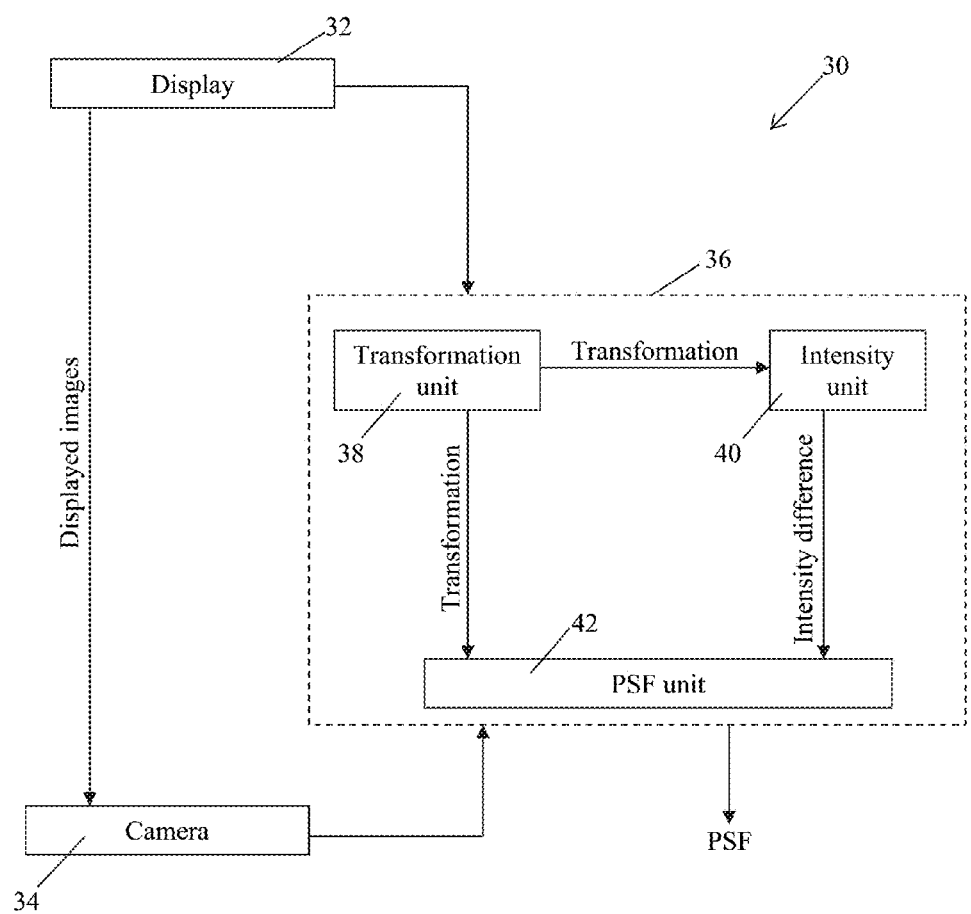
FIG. 2 is a block diagram illustrating a system for performing the method of FIG. 1, in accordance with an embodiment.

FIG. 2 illustrates one exemplary system 30 for implementing the method 10. The system 30 comprises a display 32, a camera 34 of which the intrinsic blur is to be assessed, and a processing module 36.

The display 32 is adapted to successively display at least two images comprising visual landmarks, elements having a different intensity, and a test pattern, as described above. The camera 34 is adapted to acquire the images that are displayed by the display 32. The camera has a fixed position relative to the display during the acquisition of the images by the camera 34.

The processing module 36 is adapted to characterize the intrinsic blur of the camera 34 by determining the PFS of the camera 34. The processing module 36 is in communication with the display 32 and the camera 34.

In one embodiment, the processing module 36 comprises a transformation unit 38, an intensity unit 40, and a PSF unit 42. In one embodiment, each unit 38, 40, 42 is provided with a respective processor or processing unit, a respective memory, and respective communication means. In another embodiment, the units 38, 40, and 42 share a same processor or processing unit, a same memory or storing unit, and same communication means.

The transformation unit 38 is adapted to receive information about the visual landmarks from the display 32 or any other device on which the information about the visual landmarks. For example, the information about the visual landmarks may comprise information about the location of the visual landmarks on the screen of the display 32. In an embodiment in which the visual landmarks comprise a checkerboard, the information about the visual features may comprise the position of the four corners forming a given square, for each square.

The transformation unit 38 is further adapted to receive information about the acquired image comprising the visual landmarks and determine a transformation between the coordinate system of the display 32 and that of the camera 34 using the information about the visual landmarks inserted into the displayed image and the information about the visual landmarks contained in the acquired image. In an embodiment in which the information about the visual landmarks comprises the location of the landmarks, the transformation unit 38 is adapted to determine the transformation by comparing the position of the landmarks within the acquired image to the position of the respective landmarks within the displayed image. In an embodiment in which the information about the visual landmarks comprises the position of the corners of squares forming a checkerboard, the transformation unit 38 is adapted to determine the transformation by comparing the position of the corners of the squares contained in the acquired image to that of the corners of the squares contained in the displayed image.

In one embodiment, the transformation unit 38 is adapted to determine the information about the visual landmarks contained in the displayed image and/or the information about the visual landmarks contained in the acquired image.

After determining the transformation, the transformation unit 38 is adapted to transmit the determined transformation to the intensity unit 40 and the PSF unit 42.

The intensity unit 40 is adapted to apply the transformation to the acquired image containing the elements having a different intensity and determine the difference of intensity between the acquired image containing the elements having a different intensity and the displayed image containing the elements having a different intensity.

In one embodiment, the intensity unit 420 is adapted to receive the intensity of the displayed image containing the elements having a different intensity from the display 32 or from another device adapted to determine the intensity of the image displayed on the display 32. In another embodiment, the intensity unit 40 is adapted to determine the intensity of the displayed image(s).

In one embodiment, the intensity unit 40 is adapted to receive the intensity of the acquired image containing the elements having a different intensity from the camera 34 or from another device adapted to determine the intensity of the image acquired by the camera 34. In another embodiment, the intensity unit 40 is adapted to determine the intensity of the acquired image(s).

In one embodiment, the intensity of the displayed image comprises the intensity of each pixel of the screen on which the image containing the elements having a different intensity is displayed. Similarly, the intensity of the acquired image comprises the intensity of each pixel of the camera 34 that acquires the image containing the elements having a different intensity. For example, the intensity of an image may be represented by a table of which each point represents a pixel and a corresponding intensity value is associated with each point of the table. In this case, the intensity unit 40 is adapted to apply the transformation to the table of intensities of the acquired image and determine the difference of intensity between the transformed table of intensities of the acquired image and the table of intensities of the displayed image.

In an embodiment in which the elements having a different intensity comprise a black image and a white image displayed by the display 32, the intensity unit 40 is adapted to determine the difference of intensity between the acquired white image and the displayed white image, and the difference of intensity between the acquired black image and the displayed black image.

In another embodiment in which the elements having a different intensity comprise the white squares and the black squares of a checkerboard, the intensity unit 40 is adapted to determine the difference of intensity between the white squares of the displayed image and the corresponding white squares of the acquired image, and the difference of intensity between the black squares of the displayed image and the corresponding black squares of the acquired image.

After determining the difference of intensity, the intensity unit 40 is adapted to transmit the determine difference of intensity to the PSF unit 40. In one embodiment, the difference of intensity is represented by a table of which each point represents a pixel of the camera and a respective difference of intensity is associated The PSF unit 42 receives the transformation from the transformation unit 38, the intensity difference from the intensity unit 40, the displayed image containing the test pattern from the display 32, and the acquired image containing the test pattern from the camera 34. The PSF unit 42 is adapted to apply the transformation to the acquired image containing the test pattern to correct the orientation of the acquired image and then correct the intensity of the transformed acquired image containing the test pattern using the intensity difference. Once the orientation and the intensity of the acquired image containing the test pattern have been corrected, the PSF unit 42 determines the PSF using the above-described method. The PSF unit 42 then outputs the determined PSF which may be stored in memory.

Figure 3:
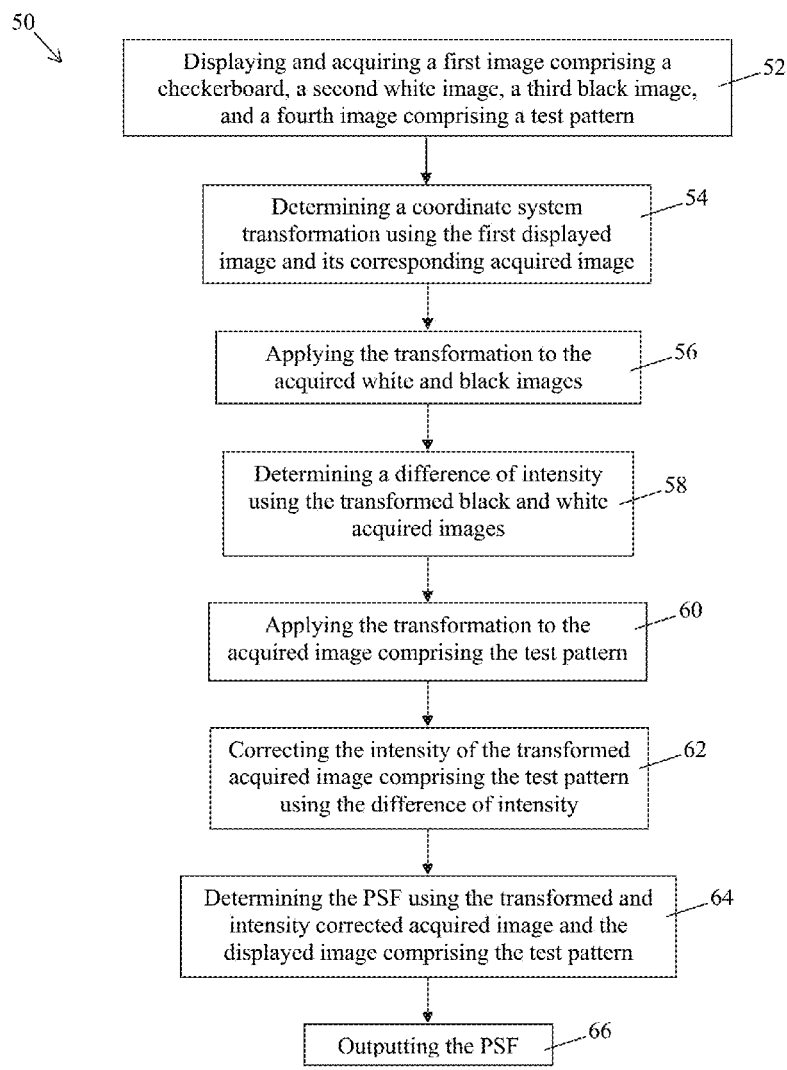
FIG. 3 is a flow chart illustrating a non-blind method for providing an estimation of a point spread function indicative of intrinsic lens blur, in accordance with a second embodiment.

FIG. 3 illustrates one exemplary computer-implemented method 50 for assessing the intrinsic blur of a camera by determining the PSF of the camera.

At step 52, four images are successively displayed on a display comprising a high-resolution screen and acquired by the camera. It should be understood that the order in which the four images are displayed may vary. The four displayed images comprises a first image containing a 25×48 checkerboard pattern as illustrated in FIGS. 4*a* and 4*e*, a second image containing a synthetic noise pattern (i.e. the test pattern) as illustrated in FIGS. 4*b* and 4*f*, a third black image as illustrated in FIGS. 4*c* and 4*g*, and a fourth white image as illustrated in FIGS. 4*d* and 4*h*.

In one embodiment, the size of the images is chosen so as to cover the entire surface area of the screen.

It should be understood that any adequate synthetic noise pattern may be used for the second image. In one embodiment, the synthetic noise pattern comprises a 0.5 expectation Bernoulli noise pattern.

At step 54, the transformation allowing aligning the coordinate system of the camera on the coordinate system of the display is determined using the first displayed image comprising the checkerboard and its corresponding acquired image.

Each square present in the checkerboard of the displayed image is identified and the position of the corners c1, c2, c3, and c4 in the display coordinate system of each square, as illustrated in FIG. 4*i* is determined. Similarly, each square present in the checkerboard of the acquired image is identified and the position of the corners c'1, c'2, c3, and c'4 of each square in the camera coordinate system, as illustrated in FIG. 4*k*, is determined While an embodiment has been disclosed, wherein the visual features comprise a checkerboard pattern, the skilled addressee will appreciate that various alternative embodiments may be provided for the visual features. For example, the visual features may comprise a pattern of black and white triangles. The pattern disclosed in Kee and Joshi may also be used.

It will be appreciated that the first image displayed may be acquired using the camera comprising the lens.

The corners of the displayed checkerboard and the corners of the acquired checkerboard are then used to find a transformation that aligns together the coordinate systems of the camera and the display. In one embodiment, a bilinear interpolation scheme is used to transform the displayed checkerboard into the camera grid space.

It should be understood that any adequate method for determining a transformation that allows aligning together the coordinate system of the display and the coordinate system of the camera may be used.

In one embodiment, a Harris corner detection method is used for detecting the corners of the displayed checkerboard and the corners of the acquired checkerboard.

By inspection, the corresponding pairs of the corner points in the displayed and acquired checkerboard are identified. These points are in fact mapped from the synthetic sharp checkerboard to the camera grid through the imaging process while some lens blur is induced.

The planar coordinates of each identified block or square using corner detection can be denoted by $c_1=(u_1,v_1)$, $c_2=(u_2,v_1)$, $c_3=(u_2,v_2)$, $c_4=(u_1,v_2)$ in the synthetic or displayed checkerboard, and by $c_1'=(x_1,y_1)$, $c_2'=(x_2,y_2)$, $c_3'=(x_3,y_3)$, $c_4'=(x_4,y_4)$ in the acquired checkerboard. The synthetic checkerboard pixels that lie in the block denoted by $c_1$, $c_2$, $c_3$, $c_4$ are mapped to the corresponding block coordinated by $c_1'$, $c_2'$, $c_3'$, $c_4'$. This is carried out by bilinear interpolation and corresponds to a warping procedure. In one embodiment, the warping procedure can be reduced to a texture mapping from a square space into an irregular quadrilateral:

$$(x \quad y) = (uv \quad u \quad v \quad 1) \begin{pmatrix} 1 & -1 & -1 & 1 \\ -1 & 1 & 0 & 0 \\ -1 & 0 & 1 & 0 \\ 1 & 0 & 0 & 0 \end{pmatrix} \begin{pmatrix} c_1' \\ c_2' \\ c_4' \\ c_3' \end{pmatrix} \quad (3)$$

where (u,v) is the pixel coordinate in the square $c_1$, $c_2$, $c_3$, $c_4$. In equation (3), (u,v) is normalized by mapping the range $[u_1,u_2]$ to [0,1] and $[v_1,v_2]$ to [0,1]. The transformed coordinate into the area $c_1'$, $c_2'$, $c_3'$, $c_4'$ is denoted by (x,y). For better accuracy, the pixels in the synthetic checkerboard i may be divided into $S_p$ sub-pixels. Hence, more samples are taken into account in the warping procedure.

Assuming that $N_{cb}$ blocks exist in the checkerboard and that the size of b is M×N, the algorithm disclosed in FIG. 5 lists the steps to warp the synthetic checkerboard i and generate the geometrically transformed checkerboard i' illustrated in FIG. 4*m*. In this algorithm, count is used to keep track of pixels that are mapped from i space into a single location in the b space. This avoids rasterization artifacts especially at the borders of warped blocks.

Once the transformation has been determined, the difference of intensity may be determined. At step 56, the determined transformation is applied to the acquired white image and the acquired black images, thereby obtaining a transformed acquired white image and a transformed acquired black image. At step 58, the difference of intensity between a displayed image and a corresponding acquired image is determined using the displayed white image and the transformed acquired white image, and the displayed black image and the transformed acquired black image, using the following method.

It will be appreciated that the camera's vignetting effect can be reproduced by means of the pictures of black and white images l and w illustrated in FIGS. 2*g* and 2*h*.

Assuming that the pixel intensity ranges from 0 to 1 in i', the intensity of sharp version u (illustrated in FIG. 4*n*) of the scene captured by the camera is calculated as:

$$u(x,y)=l(x,y)+i'(x,y)(w(x,y)-l(x,y)), \quad (4)$$

where w(x,y) and l(x,y) denote pixel intensities at (x,y) in the white and the black displayed images, respectively.

The intensity value of each pixel located at (x,y) in the geometrically transformed noise pattern (i') is then mapped to the camera space (u) intensity using intensity values of the black (l) image and white (w) image at (x,y).

Each pixel intensity i'(x,y) is normalized in the camera space using w(x,y) and l(x,y) to generate u(x,y) according to Eq. 4.

The alignment scheme avoids the estimation of the homography, distortion, and vignetting functions generally performed in prior-art non-blind PSF estimation techniques.

In one embodiment, the accurate vignetting reproduction is due to the use of camera reference intensities (black and white reference images), which is only possible if there is no change in the camera-display geometry alignment while capturing the images. This in turn becomes possible by using a high-resolution screen to expose the sequence of images.

At step 60, the transformation determined at step 54 is applied to the acquired image comprising the noise pattern, thereby obtaining a transformed acquired noise image. Then the intensity of the transformed acquired noise image is corrected using the difference of intensity, thereby obtaining a warped and color adjusted noise image at step 62.

It will be appreciated that the synthetic noise pattern is one embodiment of a test pattern. As described above, any other adequate test pattern may be used.

It will be appreciated that since the geometry alignment between camera and display is unchanged between captures, the points detected in the checkerboards are used to warp the sharp Bernoulli noise pattern image i to align it with its corresponding captured noise image b.

It will be appreciated that the at least two images having a different intensity are used to adjust the intensity of the transformed synthetic noise pattern. The resulting warped and color adjusted sharp noise pattern u will then be used as further explained below for estimating the PSF, at step 64.

It will be appreciated that considering model (2), the lens PSF is estimated by generating a linear system to solve a least squares problem with smoothness and sparsity constraints for the kernel.

In addition, since the spectrum of the Bernoulli pattern is uniform and contains all frequency components, its spectral density function (SDF) is employed to derive a prior for the PSF as further detailed below.

It will be appreciated that the Bernoulli (0.5) noise pattern used in the PSF estimation contains all frequency components and its spectrum does not contain zero magnitude frequencies. Therefore, it may be ideal for direct estimation of PSF from b and u via inverse filtering. However, the presence of unknown noise in the observation b violates the expected uniform frequency in b. Hence, direct methods result in artifacts and negative values in the estimated PSF.

Let M×N be the size of b and u and R×R be the size of k. Hereinafter, by b and u we mean the rectangular regions in these images that contain the noise pattern.

The blur model (2) can be rewritten in vector form, $$b = uk + n \quad (5)$$

where $b \in R^{MN}$, $n \in R^{MN}$, $k \in R^{RR}$, and $u \in R^{MN \times RR}$. For brevity, the sampling operator S is dropped as it is a linear operator that can be easily determined by measuring the pixel ratio between the synthetic image and the corresponding captured image.

The Bernoulli noise pattern has a homogeneous spectrum density function (SDF) $|F(i)|^2$ where $F(.)$ denotes the Fourier transform. Hence, in an ideal noise-free image acquisition, the SDF of the captured image b is $|F(i)|^2|F(k)|^2$. Therefore, the SDF of the ideal blur kernel k' is expected to be:

$$|F(k')|^2 = \frac{F(b)\overline{F(b)}}{F(u)\overline{F(u)}}, \quad (6)$$

where $\overline{\alpha}$ denotes the complex conjugate of $\alpha$.

The PSF can be estimated by solving the following function:

$$\underset{k}{\text{minimize}} E(k) = \left\|\hat{u}k - \hat{b}\right\|^2 + \lambda\|k\|^2 + \mu\|\nabla k\|^2 + \gamma\||F(k)| - |F(k')|\|, \quad (7)$$

$$\text{subject to } k \geq 0$$

where the first term is data fitting term, and the second and the third terms are kernel sparsity and kernel smoothness constraints weighted by $\lambda$ and $\mu$, respectively. The last term in equation (7) weighted by factor $\gamma$ is the constraint of the SDF of the PSF.

Note that $\|.\|$ is the $l_2$ norm and $\nabla$ is the gradient operator. Due to the use of a screen to display the target patterns and a fixed configuration for the camera, multiple noise patterns and their observations are possible.

It will be appreciated that using multiple observations and sharp correspondences in equation (7) results in a more accurate PSF.

In equation (7), $\hat{u}$ contains L stacked number of different u $\hat{u} = [u_1 u_2 \ldots u_L]^T$, $\hat{u} \in R^{MNL \times RR}$. Similarly, $\hat{b} = [b_1 b_2 \ldots b_L]^T$, $\hat{b} \in R^{MNL}$. $|F(k')|$ is also calculated using multiple sharp and observation images ($\hat{u}$ and $\hat{b}$).

The objective function of equation (7) can be written as:

$$E(k) = \frac{1}{2}\left(\hat{u}^T\hat{u} + \mu d_x d_x^T + \mu d_y d_y^T + \lambda\right)kk^T - \hat{u}^T\hat{b}k + \gamma\||F(k)| - |F(k')|\|^2, \quad (8)$$

where $d_x = [-1 1]$ and $d_y = [-1 1]^T$ are the first order derivative operators whose 2D convolution vector format in equation (8) are $d_x$ ($d_x \in R^{RR \times RR}$) and $d_y$ ($d_y \in R^{RR \times RR}$) respectively. The data fitting term and the two regularization terms in equation (8) follow a quadratic expression whose gradient is straightforward to find. Then, the gradient of the SDF constraint in equation (8) can be derived as:

$$\frac{\partial\||F(k)| - |F(k')|\|^2}{\partial k} = 2\left(k - F^{-1}\left(\frac{F(b)\overline{F(b)}}{F(u)\overline{F(u)}}e^{j\theta}\right)\right), \quad (9)$$

where $\theta$ is the phase of the Fourier transform of k' (equation (6)).

In one embodiment, the equation (8) is solved by a gradient descent solver with the descent direction as $-\partial E(k)/\partial k$.

Since the intrinsic lens blur is spatially varying, the acquired and displayed images are divided into smaller corresponding blocks, and then the PSF estimation equation (7) is solved for each block independently.

At step 66, the estimation of the PSF is outputted. For example, the PSF may be stored in memory and used for removing or reducing blur in images subsequently acquired using the camera. For example, FIGS. 6a, 6c, and 6e present blurred images and FIGS. 6b, 6d, 6f present corresponding images that were deblurred using the lens PSF determined by the above-described method.

Now referring to FIGS. 4e-4h, there are shown pictures of the displayed synthetic images shown in FIGS. 4a-4d that have been captured using the camera whose lens PSF needs to be measured.

Experimental Results

The accuracy of the alignment (calibration) technique and the PSF estimation method disclosed were tested independently.

In one embodiment, an Apple™ Retina display with a resolution of 2880×1800 was used to display the images. The method disclosed herein was compared with prior-art non-blind PSF estimation methods, as detailed below.

Alignment Evaluation

A Ximea™ Vision Camera sensor MQ022CG-CM with a 12 mm lens was used in order to test the alignment. It will be appreciated that this lens-camera configuration was chosen as it generates a reasonable geometric and radiometric distortion. The acquisition was set so that only raw images were generated and no further process was done by the camera.

The image acquisition and alignment method disclosed above was performed using the pictures of the calibration pattern and the noise target. The camera's aperture was set to be very small so that the effect of the lens blur was minimal.

Images were captured in different exposure times $10^{-6}$, $10^{-3}$ and $10^{-1}$ second, to have images with different induced noise levels. The similarity of the warped and color corrected synthetic noise pattern generated in each test was compared with the captured image using peak signal to noise ratio (PSNR) listed in Table 1. Although there is some blur in the images, the PSNR can still show the similarity between the warped synthetic pattern and the one captured by the camera.

TABLE 1

PSNR values in dB obtained between the warped and color corrected target and the observation (captured image of the target) using various methods.

| Method | Exposure (s) | | |
|---|---|---|---|
| | $10^{-6}$ | $10^{-3}$ | $10^{-1}$ |
| Disclosed herein | 31.21 | 30.88 | 29.45 |
| Joshi's | 21.30 | 19.64 | 18.98 |
| Kee's | 22.42 | 19.36 | 19.05 |
| Delbracio's | 22.82 | 20.21 | 18.91 |

Using the same camera-lens configuration, the geometric and radiometric calibration technique and the calibration patterns used in (M. Delbracio, P. Musé, A. Almansa, and J.-M. Morel, "The non-parametric sub-pixel local point spread function estimation is a well posed problem", *International Journal of Computer Vision*, 96:175-194, 2012; N. Joshi, R. Szeliski, and D. Kriegman, "PSF estimation using sharp edge prediction", *IEEE Conference on Computer Vision and Pattern Recognition (CVPR)*, pages 1-8, 2008; and E. Kee, S. Paris, S. Chen, and J. Wang, "Modeling and removing spatially-varying optical blur", *IEEE International Conference on Computational Photography (ICCP)*, pages 1-8, 2011) were employed to produce sharp correspondence of the captured targets. The PSNR values obtained for these results are listed in Table 1.

It will be appreciated that compared to the method disclosed herein, the calibration strategies used in these methods produce less accurate correspondences.

In fact, it will be appreciated that the method disclosed herein outperforms the other methods mainly because of the use of a display that enables separation of the calibration pattern from the kernel estimation target.

This leads to an accurate bilinear mapping since a calibration pattern with a large number of feature points (corners) can be used.

Moreover, the availability of a large number of corresponding feature points helps avoid error-prone homography and distortion estimation steps.

In addition, the use of a screen to display the patterns provides an accurate pixel-to-pixel intensity reference used in reproducing the camera's vignetting effect.

PSF Estimation Evaluation

The PSF estimation using Bernoulli noise patterns was evaluated in alignment-free tests to gain an insight into its accuracy.

Figure 7A:
FIG. 7a illustrates a Bernoulli (0.5) noise pattern, in accordance with an embodiment.
Figure 7B:
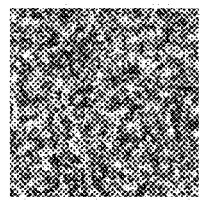
FIGS. 7b and 7c illustrate the noise pattern of FIG. 7a blurred with noise $n=N(0,0.1)$ and $n=N(0,0.01)$, respectively, in accordance with an embodiment.
Figure 7C:
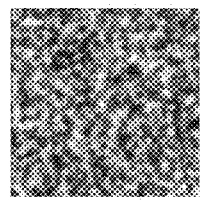
Figure 7D:
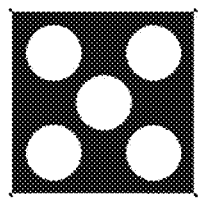
FIG. 7d illustrates the pattern disclosed by Kee, in accordance with an embodiment.
Figure 7E:
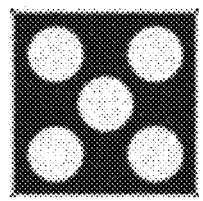
FIGS. 7e and 7f illustrate the pattern of FIG. 7d blurred with noise $n=N(0,0.1)$ and $n=N(0,0.01)$, respectively, in accordance with an embodiment.
Figure 7F:
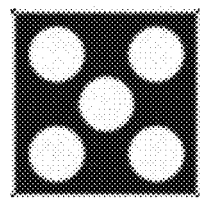
Figure 7G:
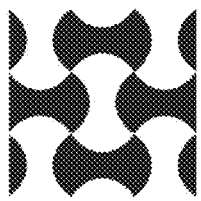
FIG. 7g illustrates the pattern disclosed by Joshi, in accordance with an embodiment.

A sharp noise pattern was blurred according to equation (2). A synthetic 17×17 Gaussian kernel with standard deviation 1.5 was generated and is shown in FIG. 7a and convolved with the noise pattern. FIG. 7d illustrates a synthetic test pattern which corresponds to the pattern disclosed by Kee while FIG. 7g illustrates a test pattern which corresponds to the pattern disclosed by Joshi.

Figure 7H:
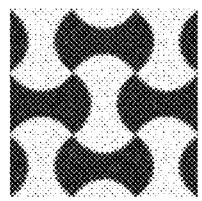
FIGS. 7h and 7i illustrate the pattern of FIG. 7g blurred with noise $n=N(0,0.1)$ and $n=N(0,0.01)$, respectively, in accordance with an embodiment.
Figure 7I:
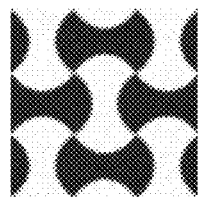

Then, zero-mean Gaussian noise n was added. FIGS. 7b and 7c show two Bernoulli patterns blurred using the pattern shown in FIG. 7a. The noise standard deviation is 0.1 and 0.01 in FIGS. 7b and 7c, respectively. FIGS. 7e and 7f show two patterns blurred using the PSF estimation pattern of Kee shown in FIG. 7d. The noise standard deviation is 0.1 and 0.01 in FIGS. 7e and 7f, respectively. FIGS. 7h and 7i show two patterns blurred using the PSF estimation pattern of Joshi shown in FIG. 7g. The noise standard deviation is 0.1 and 0.01 in FIGS. 7h and 7i, respectively. The PSF estimation was performed given the blurry and sharp noise patterns.

The regularization weights are set as $\mu=10$, $\lambda=0.10$, and $\gamma=100$ in equation (7).

Figures 8A, 8B, 8C, 8D, 8E, 8F, 8G:
FIG. 8a illustrates a ground-truth PSF, in accordance with an embodiment.
FIGS. 8b and 8h illustrate a PSF determined using the method of Delbracio for a noise $n=N(0,0.1)$ and $n=N(0, 0.01)$, respectively, in accordance with an embodiment.
FIGS. 8c and 8i illustrate a PSF determined using the method of Joshi for a noise $n=N(0,0.1)$ and $n=N(0, 0.01)$, respectively, in accordance with an embodiment.
FIGS. 8d and 8j illustrate a PSF determined using the method of Kee for a noise $n=N(0,0.1)$ and $n=N(0, 0.01)$, respectively, in accordance with an embodiment.
FIGS. 8e and 8k illustrate a PSF determined using the method of FIG. 1 for L=1 and for a noise $n=N(0,0.1)$ and $n=N(0, 0.01)$, respectively, in accordance with an embodiment.
FIGS. 8f and 8l illustrate a PSF determined using the method of FIG. 1 for L=5 and for a noise $n=N(0,0.1)$ and $n=N(0, 0.01)$, respectively, in accordance with an embodiment.
FIGS. 8g and 8m illustrate a PSF determined using the method of FIG. 1 for L=10 and for a noise n=N(0,0.1) and n=N(0, 0.01), respectively, in accordance with an embodiment.

FIG. 8e shows the estimated PSF using images shown in FIGS. 7a and 7b and its calculated PSNR with regard to the ground-truth PSF (FIG. 8a). The noise corrupted the blurry image so that there is little similarity between the blurry and the sharp image. It will be appreciated, however, that the estimated PSF is very similar to the ground-truth PSF (FIG. 8a). The PSF can be more accurately estimated by using more than one noise pattern (L factor in generating û and b̂ in equations (7) and (8)). The resulting PSFs by choosing L=5 and L=10 different Bernoulli (0.5) noise patterns and their corresponding observations are illustrated in FIGS. 8f and 8g. As the number of patterns increases, the estimated PSF looks more similar to the ground-truth. It is illustrated by the obtained PSNRs. A similar test was performed on the blurry images with a lower noise level (FIG. 7c). Although the noise level is still considerable, the resulting PSFs (FIGS. 8k, 8l and 8m) are estimated quite accurately compared to the ground-truth PSF FIG. 8a.

In order to gain an insight into the effect of the proposed SDF prior in PSF estimation, a similar experiment was performed with similar values for $\mu$ and $\lambda$, but with different values for $\gamma$. This time one single noise pattern (L=1) was used. The noise pattern shown in FIG. 7a and its blurred and noisy observations were used (FIGS. 7b and 7c).

Figures 9A, 9B, 9C:
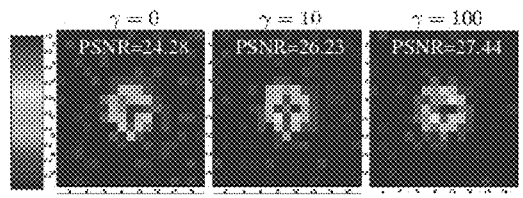
FIGS. 9a and 9d illustrate a PSF determined using the method of FIG. 1 for γ=0 and for a noise n=N(0,0.1) and n=N(0, 0.01), respectively, in accordance with an embodiment.
FIGS. 9b and 9e illustrate a PSF determined using the method of FIG. 1 for γ=10 and for a noise n=N(0,0.1) and n=N(0, 0.01), respectively, in accordance with an embodiment.
FIGS. 9c and 9f illustrate a PSF determined using the method of FIG. 1 for γ=100 and for a noise n=N(0,0.1) and n=N(0, 0.01), respectively, in accordance with an embodiment.
Figures 9D, 9E, 9F:
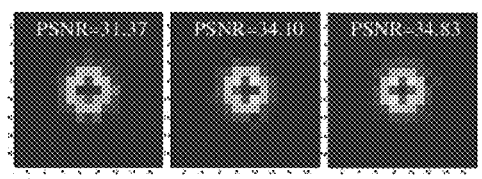

Resulting PSFs by setting the weight of the SDF prior to 0, 10 and 100 are presented in FIG. 9.

As the PSNR values indicate, employing the SDF prior increases the accuracy of the PSF even though the observations (b) are very noisy.

Figures 8H, 8I, 8J, 8K, 8L, 8M:
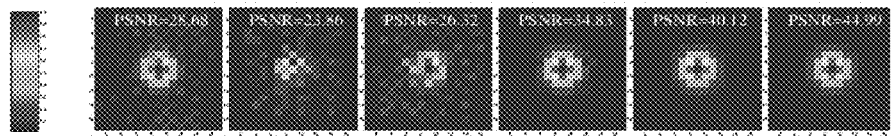

The PSF is estimated using Delbracio's method (M. Delbracio, P. Musé, A. Almansa, and J.-M. Morel, "The non-parametric sub-pixel local point spread function estimation is a well posed problem", *International Journal of Computer Vision*, 96:175-194, 2012) designed to perform well on Bernoulli noise patterns. This method fails to estimate the PSF for the image that contains a noise level of 0.1 (FIG. 7b). Even for a lower noise level (0.01), it generates a considerable amount of artifacts in the estimated PSF (FIG. 8h). This occurs in the presence of even a little amount of noise, mainly due to avoiding regularization and non-negativity constraint of the PSF in the process. The same blur and noise levels were simulated on the PSF estimation targets of Joshi (N. Joshi, R. Szeliski, and D. Kriegman, "PSF estimation using sharp edge prediction", *IEEE Conference on Computer Vision and Pattern Recognition (CVPR)*, pages 1-8, 2008) and Kee (E. Kee, S. Paris, S. Chen, and J. Wang, "Modeling and removing spatially-varying optical blur", *IEEE International Conference on Computational Photography (ICCP)*, pages 1-8, 2011) shown in FIGS. 7d and 7g, and then employed their proposed methods to estimate the PSF. In all cases, it will be appreciated that the proposed PSF estimation technique generates more accurate PSFs than these methods as illustrated in FIG. 8.

Experiments

Two camera devices were selected to test the proposed PSF measurement technique. More precisely, a Ximea™ Vision Camera (MQ022CG-CM) sensor whose resolution is 2048×1088 with a 12 mm lens, and a Blackberry™ mobile phone's front-facing camera with resolution 1600×1200 were used.

It will be appreciated that, unlike SLR cameras, these cameras have small pixel sensors and create a large amount of noise. Hence, it is more challenging to measure their lens blur. Camera-target alignment was performed as explained above.

The checkerboard pattern and the white and black images illustrated in FIGS. 4a, 4c, and 4d, respectively, were used in the alignment, and five different Bernoulli noise patterns (L=5) were used in the PSF estimation. It will be appreciated that the image acquisition was done in RAW format, so that PSF measurement was performed for each of the four different color channels that exist in the Bayer's grid. It will be appreciated that this avoids demosaicing, white-balancing, and any other post/pre-processing typically done in cameras. It will also be appreciated that it is critical not to estimate a single PSF for all the four channels, as this results in chromatic aberrations once used in a deconvolution. Since the PSFs vary spatially in the camera space, PSF estimation was carried out on non-overlapping blocks of 128×128. The distance between the camera and the display was set to maintain a 1:2 ratio between the camera pixels and the screen pixels (S in equations (1) and (2)). Note that the screen may not cover the whole camera grid. Therefore, the whole process should be performed for various placements of the display until the PSFs are estimated for the entire camera grid.

For both cameras, the screen needed to be shifted to 9 different locations in order to cover the whole camera grid. A total of 136 PSFs per channel were estimated for the Ximea™ camera.

PSFs of all channels are overlaid and illustrated in FIG. 9. In a similar way, the process on the Blackberry™ phone's camera generated 117 PSFs.

The measured PSFs along with sample images captured with these cameras were passed to a deconvolution algorithm. Heide's deconvolution algorithm (F. Heide, M. Rouf, M. B. Hullin, B. Labitzke, W. Heidrich, and A. Kolb, "High-quality computational imaging through simple lenses", *ACM Transactions on Graphics (SIGGRAPH)*, 2013) was applied, as it handles chromatic artifacts successfully by employing a cross-channel prior.

Figure 10:
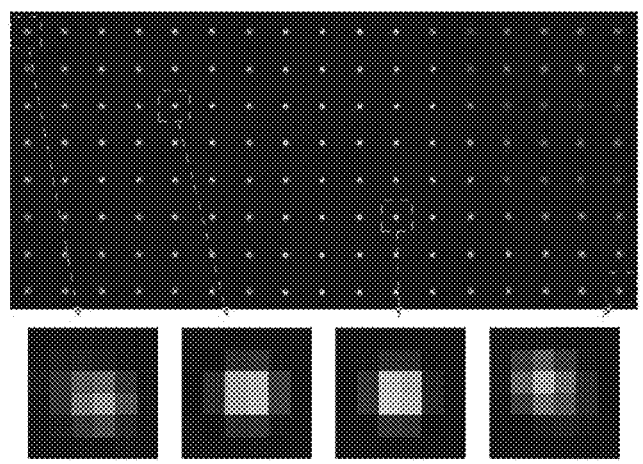
FIG. 10 illustrates a lens PSF measured for a Ximea™ camera, in accordance with an embodiment.

FIG. 10 shows the deconvolution results using the measured PSFs applied on the images captured by the Ximea™ and the Blackberry™ cameras. It will be appreciated that these results demonstrate how the measured lens PSFs are used to significantly enhance the quality of the images captured by the cameras.

It will be appreciated that the proposed camera-scene alignment benefits from a high-resolution display to expose the calibration patterns. The fixed setup between the camera and the display allows switching of different patterns and capturing their images in a fixed geometric alignment. Hence, the calibration pattern can be separated from the pattern used in the PSF estimation.

As a result, there is more flexibility to provide a large number of feature points in the calibration pattern and to guide the alignment more precisely.

The warping procedure is reduced to a simple texture mapping due to appropriate number of feature points.

Also, it will be appreciated that this fixed camera-scene alignment is used to produce intensity reference images to have pixel-to-pixel color correction in generating the sharp correspondence of the target image.

The PSF estimation method disclosed herein benefits from the frequency specifications of Bernoulli noise patterns to introduce an SDF constraint for the PSF. It is then used jointly with regularization terms in a non-negative constrained linear system to generate accurate lens PSFs.

Although the above description relates to a specific preferred embodiment as presently contemplated by the inventor, it will be understood that the invention in its broad aspect includes functional equivalents of the elements described herein.

The invention claimed is:

1. A computer-implemented method for providing an estimation of a point spread function indicative of intrinsic lens blur of a camera, the method comprising:
   successively displaying at least two images on a same display unit, the at least two images comprising visual features, elements having a different optical intensity, and a test pattern;
   acquiring the at least two images using the camera;
   determining a coordinate transformation using the image displayed comprising the visual features and the corresponding acquired image, the coordinate transformation for aligning together a coordinate system of the camera and a coordinate system of the display unit;
   aligning the acquired image comprising the elements having a different optical intensity using the determined coordinate system and determining a difference of intensity between the displayed image comprising the elements having a different optical intensity and the corresponding acquired image;
   aligning the acquired image comprising the test pattern using the determined coordinate transformation and correcting an intensity of the acquired image comprising the test pattern using the determined difference of intensity, thereby obtaining a corrected image;
   estimating a point spread function using the corrected image; and
   outputting the estimation of the point spread function.

2. The computer-implemented method of claim 1, wherein said displaying at least two images comprises displaying a first image comprises black and white features and a second image comprising the test pattern, the black and white features corresponding to both the visual features and the elements having a different intensity.

3. The computer-implemented method of claim 2, further comprising generating a white image and a black image using the first image comprising black and white features.

4. The computer-implemented method of claim 1, wherein said displaying at least two images comprises displaying a first image comprising the visual features, a second black image, a third white image, and a fourth image comprising the test pattern.

5. The computer-implemented method of claim 4, wherein the visual features comprise a checkerboard.

6. The computer-implemented method of claim 5, wherein said determining a coordinate transformation comprises:

identifying a position of white and black squares contained in the checkerboard of the displayed first image and in a checkerboard of the corresponding acquired image, said determining a coordinate transformation being performed using the position of the white and black squares.

7. The computer-implemented method of claim 6, wherein the position of the white and black squares is represented by a position of corners of the white and black squares.

8. The computer-implemented method of claim 7, wherein said determining a coordinate transformation comprises using a bilinear interpolation.

9. The computer-implemented method of claim 4, wherein determining a difference of intensity comprises determining a difference of intensity between the displayed second black image and a corresponding one of the at least two acquired images and determining a difference of intensity between the displayed third white image and a corresponding one of the at least two acquired images.

10. The computer-implemented method of claim 1, wherein the test pattern comprises a Bernoulli noise pattern.

11. The computer-implemented method of claim 1, wherein said displaying comprises using a display having a high resolution screen.

12. A system for providing an estimation of a point spread function (PSF) indicative of intrinsic lens blur of a camera, the method comprising:
   a display for successively displaying at least two images thereon, the at least two images comprising visual features, elements having a different optical intensity, and a test pattern;
   a camera for acquiring the at least two images using the camera; and
   a processor, the processor comprising:
      a transformation module for determining a coordinate transformation using the image displayed comprising the visual features and the corresponding acquired image, the coordinate transformation for aligning together a coordinate system of the camera and a coordinate system of the display unit;
      an intensity module for aligning the acquired image comprising the elements having a different optical intensity using the determined coordinate system and determining a difference of intensity between the displayed image comprising the elements having a different optical intensity and the corresponding acquired image; and
      a PSF module for aligning the acquired image comprising the test pattern using the determined coordinate transformation, correcting an intensity of the acquired image comprising the test pattern using the determined difference of intensity, thereby obtaining a corrected image, estimating a point spread function using the corrected image, and outputting the estimation of the point spread function.

13. The system of claim 12, wherein the display is adapted to display a first image comprising black and white features and a second image comprising the test pattern, the black and white features corresponding to both the visual features and the elements having a different intensity.

14. The system of claim 13, wherein the intensity module is further adapted to generate a white image and a black image using the first image.

15. The system of claim 12, wherein the display is adapted to display a first image comprising the visual features, a second black image, a third white image, and a fourth image comprising the test pattern.

16. The system of claim 15, wherein the visual features comprise a checkerboard.

17. The system of claim 16, wherein the transformation module is adapted to:
   identify a position of white and black squares contained in the checkerboard of the displayed first image and in a checkerboard of the corresponding acquired image, the transformation module being adapted to determine the coordinate transformation using the position of the white and black squares.

18. The system of claim 17, wherein the position of the white and black squares is represented by a position of corners of the white and black squares.

19. The system of claim 18, wherein the transformation module is adapted to use a bilinear interpolation for determining the coordinate transformation.

20. The system of claim 15, wherein the intensity module is adapted to determine a difference of intensity between the displayed second black image and a corresponding one of the at least two acquired images and determine a difference of intensity between the displayed third white image and a corresponding one of the at least two acquired images.

* * * * *